US011680126B2

(12) United States Patent
Lee et al.

(10) Patent No.: US 11,680,126 B2
(45) Date of Patent: Jun. 20, 2023

(54) THERMOPLASTIC ELASTOMER COMPOSITION AND THERMOPLASTIC ELASTOMER MANUFACTURED BY USING THE SAME

(71) Applicants: HYUNDAI MOTOR COMPANY, Seoul (KR); Kia Corporation, Seoul (KR); HWASEUNG Material Co., Ltd., Yangsan-si (KR); Research & Business Foundation SUNGKYUNKWAN UNIVERSITY, Suwon-si (KR)

(72) Inventors: Sang Hyun Lee, Jeju-si (KR); JeeHoon Seong, Gwangmyeong-si (KR); Ho Dong Kim, Jecheon-si (KR); Jonghwan Suhr, Suwon-si (KR); Bumyong Yoon, Suwon-si (KR); Seunghyun Cho, Suwon-si (KR); Kyoung-Min Hong, Yangsan-si (KR); Sang Hyun Lee, Yangsan-si (KR)

(73) Assignees: HYUNDAI MOTOR COMPANY, Seoul (KR); KIA CORPORATION, Seoul (KR); HAWSEUNG Material Co., Ltd., Yangsan-si (KR); Research & Business Foundation SUNGKYUNKWAN UNIVERSITY, Suwon-si (KR)

(*) Notice: Subject to any disclaimer, the term of this patent is extended or adjusted under 35 U.S.C. 154(b) by 0 days.

(21) Appl. No.: 17/532,473

(22) Filed: Nov. 22, 2021

(65) Prior Publication Data

US 2022/0282018 A1 Sep. 8, 2022

(30) Foreign Application Priority Data

Mar. 2, 2021 (KR) .................. 10-2021-0027197

(51) Int. Cl.
| | | |
|---|---|---|
| *C08F 255/02* | (2006.01) | |
| *C08L 23/12* | (2006.01) | |
| *C08J 3/00* | (2006.01) | |
| *C08J 3/24* | (2006.01) | |
| *C08K 5/00* | (2006.01) | |

(52) U.S. Cl.
CPC ............. *C08F 255/02* (2013.01); *C08J 3/005* (2013.01); *C08J 3/24* (2013.01); *C08K 5/0016* (2013.01); *C08L 23/12* (2013.01); *C08L 2312/02* (2013.01)

(58) Field of Classification Search
CPC ....... C08L 23/12; C08L 23/16; C08K 5/0016; C08K 3/013
See application file for complete search history.

(56) References Cited

U.S. PATENT DOCUMENTS

2009/0120007 A1\* 5/2009 Aritake .................... B60J 10/17
49/490.1
2014/0336290 A1\* 11/2014 Jourdain ................ C08J 9/0061
521/88
2015/0210838 A1\* 7/2015 Wu ........................ C08L 91/00
428/36.9

\* cited by examiner

*Primary Examiner* — Mark S Kaucher
(74) *Attorney, Agent, or Firm* — Morgan, Lewis & Bockius LLP

(57) ABSTRACT

A thermoplastic elastomer composition includes about 80 parts by weight of an ethylene propylene diene monomer (EPDM) including 5-ethylidene-2-norbornene (ENB) and polyethylene, about 30 parts by weight to about 70 parts by weight of polypropylene, about 20 parts by weight to about 40 parts by weight of a filler, and about 60 parts by weight to about 90 parts by weight of a plasticizer.

13 Claims, 11 Drawing Sheets

THERMOPLASTIC ELASTOMER COMPOSITION AND THERMOPLASTIC ELASTOMER MANUFACTURED BY USING THE SAME

CROSS-REFERENCE TO RELATED APPLICATION

This application claims priority to and the benefit of Korean Patent Application No. 10-2021-0027197 filed in the Korean Intellectual Property Office on Mar. 2, 2021, the entire contents of which are incorporated herein by reference.

TECHNICAL FIELD

The present disclosure relates to a composition of an EPDM/PP thermoplastic elastomer having improved material damping properties and compression set at the same time, and a thermoplastic elastomer manufactured by using the same.

BACKGROUND

A weather strip is disposed around a vehicle body or door and thus helps a door glass operate along a correct track or prevent it from escaping therefrom when it goes up and down. In addition, the weather strip serves as a sealing function of blocking an inflow of foreign substances such as snow and rain between the door glass and the vehicle door.

In particular, an inner belt weather strip seals vehicle interiors and the door glass to block the inflow of foreign substances and wind noises. The inner belt weather strip requires not only sealing performance but also excellent dust and sound insulation performance. In other words, there may be a problem of vibration and noise generated by frictions between the door glass and the inner belt weather strip.

On the other hand, an EPDM/PP thermoplastic elastomer is prepared through a blend process of a thermosetting elastomer (EPDM) and a thermoplastic plastic (PP), specifically, through dynamical crosslinking in which EPDM is crosslinked during the blending process.

This EPDM/PP thermoplastic elastomer is prepared by introducing the thermoplastic plastic into the thermosetting elastomer (EPDM), and unlike a conventional thermosetting elastomer, the EPDM/PP thermoplastic elastomer may be remolded and recycled, which features environmental friendliness, and also, has a lower density than EPDM. Accordingly, the EPDM/PP thermoplastic elastomer is being used in an automobile industry as an eco-friendly and light weight material.

However, since the EPDM/PP thermoplastic elastomer has a low material damping property, when applied to the inner belt weather strip, there is a problem that noise and vibration due to frictions occur at a low temperature (about −4° C. to about 4° C.). In addition, when the material damping is increased, a compression set is also increased, which adversely affects the sealing performance of the inner belt weather strip.

SUMMARY

An embodiment provides a thermoplastic elastomer composition that simultaneously improves a material damping performance and the compression set, so that when applied to the inner belt weather strip, a sealing performance is improved and friction noise and vibration are reduced at the same time to improve the emotional quality.

According to an embodiment, a thermoplastic elastomer composition includes about 80 parts by weight of an ethylene propylene diene monomer (EPDM) including 5-ethylidene-2-norbornene (ENB) and polyethylene, about 30 parts by weight to about 70 parts by weight of polypropylene, about 20 parts by weight to about 40 parts by weight of a filler, and about 60 parts by weight to about 90 parts by weight of a plasticizer.

The ethylene propylene diene monomer may include about 5 wt % to about 10 wt % of 5-ethylidene-2-norbornene and about 50 wt % to about 70 wt % of polyethylene, based on the total weight of the ethylene propylene diene monomer.

The ethylene propylene diene monomer may include about 8.9 wt % to about 10 wt % of 5-ethylidene-2-norbornene and about 50 wt % to about 58 wt % of polyethylene, based on the total weight of the ethylene propylene diene monomer.

The ethylene propylene diene monomer may have a crystallinity of about 0% to about 15.8%, a crosslinking density of about $2.26 \times 10^{-4}$ mol/ml to about $2.68 \times 10^{-4}$ mol/ml, and a molecular weight distribution of about 3.4 to about 4.3.

The thermoplastic elastomer composition may include about 30 parts by weight to about 35 parts by weight of polypropylene.

The polypropylene may have a crystallinity of about 52% to about 60%.

The thermoplastic elastomer composition may include about 85 parts by weight to about 90 parts by weight of the plasticizer.

The thermoplastic elastomer composition may further include about 0.1 parts by weight to about 1.25 parts by weight of a crosslink agent.

The thermoplastic elastomer composition may further include about 0.1 parts by weight to about 0.5 parts by weight of a crosslink aid, about 0.1 parts by weight to about 0.5 parts by weight of an antioxidant, about 1 part by weight to about 3 parts by weight of a surface modifier, about 1 part by weight to about 3 parts by weight of a lubricant, about 1 part by weight to about 3 parts by weight of a crosslink accelerator, about 1 part by weight to about 5 parts by weight of a UV stabilizer, or a mixture thereof.

According to another embodiment, a thermoplastic elastomer manufactured of the thermoplastic elastomer composition according to an embodiment has a loss factor (Tan δ) of greater than or equal to about 0.139, and has a compression set of less than or equal to about 45.44%.

The thermoplastic elastomer may have a loss factor (Tan δ) of about 0.144 to about 0.158, and a compression set of about 29.53% to about 35.35%.

The thermoplastic elastomer may have a static friction coefficient of less than or equal to about 0.9, a kinetic friction coefficient of less than or equal to about 0.69, and a maximum acceleration of less than or equal to about 2.44 g during stick slip.

According to another embodiment, a method for manufacturing a thermoplastic elastomer includes mixing powders including fillers, introducing an ethylene propylene diene monomer (EPDM), polypropylene (PP), and the mixed powders into an extruder, mixing the ethylene propylene diene monomer and polypropylene in the extruder, and dynamically crosslinking the ethylene propylene diene monomer.

According to another embodiment, a weather strip for a vehicle includes a thermoplastic elastomer according to another embodiment.

The thermoplastic elastomer composition according to an embodiment simultaneously improves a material damping performance and a compression set, so that when applied to the inner belt weather strip, a sealing performance is improved and friction noise and vibration are reduced at the same time to improve the emotional quality.

DETAILED DESCRIPTION OF THE EMBODIMENTS

Figure 1:
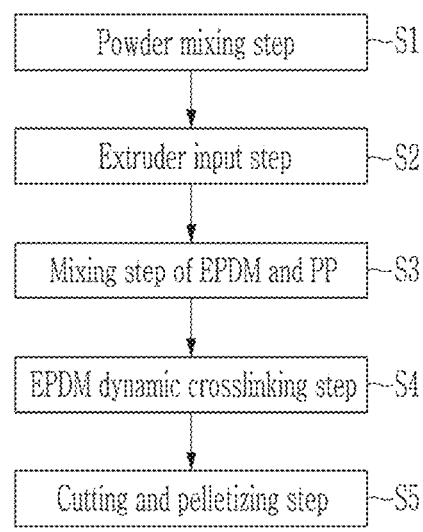
FIG. 1 is a process flowchart illustrating a manufacturing process of a thermoplastic elastomer according to an embodiment.

The advantages and features of the present disclosure and the methods for accomplishing the same will be apparent from the embodiments described hereinafter with reference to the accompanying drawings. However, the embodiments should not be construed as being limited to the embodiments set forth herein. If not defined otherwise, all terms (including technical and scientific terms) in the specification may be defined as commonly understood by one skilled in the art. In addition, terms defined in a commonly used dictionary are not to be ideally or excessively interpreted unless explicitly defined.

In addition, unless explicitly described to the contrary, the word "comprise," and variations such as "comprises" or "comprising," will be understood to imply the inclusion of stated elements but not the exclusion of any other elements.

Further, the singular includes the plural unless mentioned otherwise.

A thermoplastic elastomer composition according to an embodiment includes about 80 parts by weight of an ethylene propylene diene monomer (EPDM), about 30 parts by weight to about 70 parts by weight of polypropylene, about 20 parts by weight to about 40 parts by weight of a filler, and about 60 parts by weight to about 90 parts by weight of a plasticizer.

The term, "about", or equivalent thereof, as used herein includes a stated value and an average value within an acceptable range of deviation of a particular value determined by a person of ordinary skill in the art, by considering measurement errors associated with measurement of a particular parameter.

The thermoplastic elastomer composition may include a mixture of ethylene propylene diene monomer and polypropylene as a matrix resin.

The ethylene propylene diene monomer may improve extrusion formability and recovery rate of door side extrusion molding parts, and strengthen weather resistance and heat resistance characteristics.

The ethylene propylene diene monomer may be included in an amount of about 80 parts by weight. If the content of the ethylene propylene diene monomer is too small, product flowability may be defective during extrusion molding, resulting in reduced dimensional stability, difficult molding, and decrease of a recovery rate of the product. If the content of the ethylene propylene diene monomer is too much, hardness of the finished product increases, and characteristics of compression load and compression set, which have a great effect on door side performance, may decrease, and there may be difficulties in work when installing the final product on the door.

The ethylene propylene diene monomer may include 5-ethylidene-2-norbornene (ENB) and polyethylene.

The polyethylene may be included in an amount of about 50 wt % to about 70 wt %, for example, less than or equal to about 76 wt %, less than or equal to about 62 wt %, less than or equal to about 58 wt %, or less than or equal to about 56 wt %, based on the total weight of the ethylene propylene diene monomer. As the content of polyethylene in the ethylene propylene diene monomer decreases, a loss factor (Tan δ), which is a material damping property of the thermoplastic elastomer, may increase, and the compression set may decrease.

If the content of polyethylene is less than about 50 wt % based on the total weight of the ethylene propylene diene monomer, the tensile strength may be lowered and deterioration of physical properties may occur. If the content of polyethylene exceeds about 70 wt %, crystallinity may be increased, thereby reducing the compression set.

The 5-ethylidene-2-norbornene may be included in an amount of about 5 wt % to about 10 wt %, for example greater than or equal to about 5.7 wt %, greater than or equal to about 7.3 wt %, or greater than or equal to about 8.9 wt % based on the total weight of the ethylene propylene diene monomer. As the content of 5-ethylidene-2-norbornene in the ethylene propylene diene monomer increases, the loss factor (Tan δ), which is a material damping property of the thermoplastic elastomer, may increase, and the compression set may decrease.

When the content of 5-ethylidene-2-norbornene is less than about 5 wt % based on the total weight of the ethylene propylene diene monomer, extrusion and injection molding may be difficult, and when the content of 5-ethylidene-2-norbornene exceeds about 10 wt %, the hardness and strength of the product increase and thus cutting may be difficult during extrusion and injection molding.

As the content of polyethylene in the ethylene propylene diene monomer increases, the crystallinity of the ethylene propylene diene monomer increases, and as the content of 5-ethylidene-2-norbornene increases, the crosslinking density of the ethylene propylene diene monomer increases. Accordingly, the ethylene propylene diene monomer may have a crystallinity of 0% to 15.8%, a crosslinking density of about $2.26 \times 10^{-4}$ mol/ml to about $2.68 \times 10^{-4}$ mol/ml, and a molecular weight distribution of about 3.4 to about 4.3. The crystallinity increases with an increase in the PE content in the ethylene propylene diene monomer, and the molecular weight distribution may differ depending on the polymerization catalyst (Ziegler-Natta-broad distribution, metallocene-narrow distribution) when preparing the ethylene propylene diene monomer. Accordingly, as the crystallinity of the ethylene propylene diene monomer decreases, the crosslinking density increases, and the molecular weight distribution increases, the loss factor (Tan δ), which is a material damping property of the thermoplastic elastomer, may increase, and the compression set may decrease.

Polypropylene (PP) serves to form a matrix of the ethylene propylene diene monomer and enhances oil resistance and heat resistance properties. The polypropylene may be included in an amount of about 30 parts by weight to about 70 parts by weight, for example, about 30 parts by weight to about 35 parts by weight based on about 80 parts by weight of the ethylene propylene diene monomer. When the polypropylene is included in an amount of less than about 30 parts by weight, extrusion molding may hardly be performed due to low flowability, but when the polypropylene is included in an amount of greater than about 70 parts by weight, performance may be deteriorated due to an increase in hardness of a finished product, and there may be difficulty in installing a door side extrusion molding part.

The polypropylene may be homo polypropylene having crystallinity of about 52% to about 60%. The homo polypropylene has higher crystallinity than a random copolymer or a block copolymer with the polyethylene. As the polypropylene has lower crystallinity, a loss factor (Tan δ), the material damping property of the thermoplastic elastomer may increase, but the compression set thereof may decrease.

The plasticizer may be, for example, high viscosity paraffin oil, and the high viscosity paraffin oil may have kinematic viscosity of about 170 or higher at about 40° C.

The plasticizer promotes processability in preparing the thermoplastic elastomer composition and also promotes dispersion of a filler and the like. In addition, the plasticizer serves to reduce hardness of the thermoplastic elastomer composition and thereby, increase plasticity and moldability.

The plasticizer may be included in an amount of about 60 parts by weight to about 90 parts by weight based on about 80 parts by weight of the ethylene propylene diene monomer, for example, greater than or equal to about 65 parts by weight, greater than or equal to about 75 parts by weight, or greater than or equal to about 85 parts by weight. As the content of the plasticizer increases, the loss factor (Tan δ), which is a material damping property of the thermoplastic elastomer, may increase, and the compression set may decrease.

When the plasticizer is included in an amount of less than about 60 parts by weight, flowability may be deteriorated during the extrusion molding, which may cause molding defects and work defects, but when the plasticizer is included in an amount of greater than about 90 parts by weight, the flowability may be increased, deteriorating an extrusion shape and requiring a long cooling time.

The thermoplastic elastomer composition may further include a crosslink agent. For example, the crosslink agent may include a phenolic resin crosslink agent, a peroxide crosslink agent, a silane crosslink agent, or a combination thereof.

The crosslink agent may play a role of crosslinking a rubber moiety to express properties of the thermoplastic elastomer. The thermoplastic elastomer is prepared to have rubber-like viscosity and elastic properties through dynamic crosslinking by adding the crosslink agent to crosslink the rubber moiety, which is a soft segment, and using a twin-screw extruder. Herein, the phenolic resin crosslink agent is a chemical which is very sensitive to moisture and thus may cause a problem due to water absorption in summer, but the peroxide crosslink agent has fewer problems due to the moisture absorption than the phenolic resin crosslink agent.

For example, the peroxide crosslink agent may have a structure of 2,5-dimethyl-2,5-di-(tert-butylperoxy)-hexane, a half-life temperature of about 170° C., and a molecular weight of greater than or equal to about 290.

The crosslink agent may be included in an amount of about 0.1 parts by weight to about 1.25 parts by weight, for example, less than or equal to about 1.0 parts by weight, or less than or equal to about 0.76 parts by weight based on about 80 parts by weight of an ethylene propylene diene monomer. As the content of the crosslink agent decreases, the loss factor (Tan δ), which is the damping property of the thermoplastic elastomer, may increase.

When the crosslink agent is included in an amount of less than about 0.1 parts by weight, the crosslinking insufficiently occurs, deteriorating properties and elasticity of the finished product, and when the crosslink agent is included in an amount of greater than about 1.25 parts by weight, since the crosslinking occurs too much, foreign substances such as fish-eyes on the exterior may be observed, causing appearance defects and moldability defects of an extrusion molder.

The filler may be an inorganic filler, for example, the inorganic filler may be calcium carbonate having a particle size of less than or equal to about 10 μm and a whiteness of greater than or equal to about 95%.

The filler may be included in an amount of about 20 parts by weight to about 40 parts by weight based on about 80 parts by weight of the ethylene propylene diene monomer. When the filler is included in an amount of less than about 20 parts by weight, a cost of other materials may be increased, and the filler effect may be insufficient, but when the filler is included in an amount of greater than about 40 parts by weight, extrusion molding may be difficult to conduct due to increased hardness and reduced flowability of materials.

The thermoplastic elastomer composition may further include other additives such as a crosslink aid, an antioxidant, a surface modifier, a lubricant, a crosslink accelerator, a UV stabilizer, or a mixture thereof. For example, the thermoplastic elastomer composition may further include about 0.1 parts by weight to about 0.5 parts by weight of a crosslink aid, about 0.1 parts by weight to about 0.5 parts by weight of an antioxidant, about 1 part by weight to about 3 parts by weight of a surface modifier, about 1 part by weight to about 3 parts by weight of a lubricant, about 1 part by weight to about 3 parts by weight of a crosslink accelerator, about 1 part by weight to about 5 parts by weight of a UV stabilizer, or a mixture thereof, based on 80 parts by weight of the ethylene propylene diene monomer.

For example, the crosslink aid may be N,N'-m-phenylenedimaleimide, 1,2-polybutadiene, or a mixture thereof.

When the crosslink aid is used in an amount of less than about 0.1 parts by weight, an effect thereof may be insignificant, but when the crosslink aid is used in an amount of greater than about 0.5 parts by weight, fish eyes may occur on the surface of a product due to over-crosslinking, deteriorating appearance of the product.

The antioxidant has a melting point of greater than or equal to about 120° C. and whiteness of greater than or equal to about 95%, for example, may be tetrakis(3,5-di-tertbutyl-4-hydroxyphenyl)propionate), tetrakis-(3-dodecylthiopropionate), or a mixture thereof.

When the antioxidant is used in an amount of less than about 0.1 parts by weight, properties of the thermoplastic elastomer composition are deteriorated, and when a finished product is used for a long time, performance thereof may be deteriorated. When the antioxidant is used in an amount of about 0.5 parts by weight, a blooming phenomenon may occur to the product.

The surface modifier may be, for example, polypropylene-based wax. The polypropylene-based wax may have a specific gravity of about 0.90 or less and a melting point of about 160° C. or higher.

When a content of the surface modifier is less than about 1 part by weight, an effect of improving scratch resistance of a finished product may be insufficient, and thus abrasion resistance thereof may be deteriorated, and when the content of the surface modifier is greater than about 3 parts by weight, the surface modifier may be transferred to the surface of the finished product, failing in realizing product characteristics.

The UV stabilizer may be, for example, a benzotriazole-type UV absorber, an oligomeric HALS (hindered amine light stabilizer)-type UV stabilizer, or a mixture thereof.

When a content of the UV stabilizer is less than about 1 part by weight, surface whitening and microcracks may occur due to UV attacks, but when the content of the UV stabilizer is greater than about 5 parts by weight, the UV stabilizer having a low molecular weight may be transferred onto the surface and cause blooming on the exterior of a product.

According to another embodiment, a thermoplastic elastomer is prepared by using the thermoplastic elastomer composition.

As described above, as the content of polyethylene in the ethylene propylene diene monomer of the thermoplastic elastomer composition decreases, but the content of 5-ethylidene-2-norbornene in the ethylene propylene diene monomer increases, crystallinity of the ethylene propylene diene monomer is reduced, but crosslinking density thereof is increased, and as a molecular weight distribution increases, the loss factor (Tan δ), which is a material damping property of the thermoplastic elastomer, may increase, but the compression set may decrease.

In addition, as the polypropylene of the thermoplastic elastomer composition has lower crystallinity, the content of the plasticizer increases, and as the content of the crosslink agent decreases, the loss factor (Tan δ), which is the material damping property of the thermoplastic elastomer, may increase, but the compression set may decrease.

Accordingly, in the thermoplastic elastomer prepared by using the thermoplastic elastomer composition, the material damping performance and the compression set, which are in trade-off relationship, are simultaneously improved.

For example, the thermoplastic elastomer may have a loss factor (Tan δ), which exhibits the material damping performance, when measured at room temperature (24° C.), of greater than or equal to about 0.139, for example, greater than or equal to about 0.140, greater than or equal to about 0.141, greater than or equal to about 0.142, greater than or equal to about 0.143, greater than or equal to about 0.144, greater than or equal to about 0.145, greater than or equal to about 0.148, greater than or equal to about 0.149, greater than or equal to about 0.150, greater than or equal to about 0.152, greater than or equal to about 0.153, greater than or equal to about 0.155, or greater than or equal to about 0.158, or about 0.144 to about 0.158.

In addition, the thermoplastic elastomer may have a loss factor (Tan δ) which exhibits the material damping performance, when measured at a low temperature (about −4° C. to about 4° C.), of greater than or equal to about 0.110, for example, greater than or equal to about 0.114, greater than or equal to about 0.115, greater than or equal to about 0.116, greater than or equal to about 0.117, greater than or equal to about 0.118, greater than or equal to about 0.121, greater than or equal to about 0.122, greater than or equal to about 0.123, or greater than or equal to about 0.124.

The loss factor (Tan δ), which exhibits the material damping performance, may be obtained by performing temperature sweep at a dynamic strain of about 0.2% and about 10 Hz with a Q850 equipment (dynamic mechanical analysis, DMA) made by TA Instruments and calculating each average Tan δ at room temperature (about 24° C.) or low temperature (about −4° C. to about 4° C.).

The thermoplastic elastomer may have a compression set of less than or equal to about 45.44%, for example less than or equal to about 43.75%, less than or equal to about 43.26%, less than or equal to about 43.13%, less than or equal to about 42.97%, less than or equal to about 40.49%, less than or equal to about 35.35%, less than or equal to about 34.59%, less than or equal to about 31.45%, less than or equal to about 30.94%, less than or equal to about 30.70%, less than or equal to about 30.44%, less than or equal to about 30.37%, less than or equal to about 30.29%, less than or equal to about 30.17%, less than or equal to about 30.04%, less than or equal to about 29.51%, less than or equal to about 28.17%, less than or equal to about 29.53%, less than or equal to about 29.51%, less than or equal to about or 27.55%, or about 29.53% to about 35.35%.

The compression set may be measured by applying a strain of about 25% according to ISO815 and then, proceeding it for about 22 hours in an about 70° C. oven.

In addition, the thermoplastic elastomer may have a static friction coefficient of less than or equal to about 0.9, for example, less than or equal to about 0.83, or less than or equal to about 0.69, a kinetic friction coefficient of less than or equal to about 0.69, for example, less than or equal to about 0.67, or less than or equal to about 0.64, and a maximum acceleration, which exhibits noise acceleration during the stick slip, of less than or equal to about 2.44 g, for example, less than or equal to about 1.38 g, or less than or equal to about 1.03 g (herein, g is a unit of gravitational acceleration, 1 g=9.81 m/s$^2$).

The friction coefficient and the maximum acceleration during the stick slip may be obtained by using an equipment made by Zins-Ziegler Instrument GmbH to conduct a friction test under a vertical load of about 5 N at about 3 mm/s and thus measure a friction coefficient and an acceleration peak during the stick slip.

As such, as the material damping performance and the compression set are improved at the same time, the thermoplastic elastomer improves the sealing performance when applied to the inner belt weather strip and at the same time reduces friction noise and vibration, thereby contributing to the improvement of emotional quality.

FIG. 1 is a process flow chart showing a process of manufacturing a thermoplastic elastomer according to another embodiment.

Referring to FIG. 1, the method for manufacturing a thermoplastic elastomer includes a powder mixing step (S1), an extruder input step (S2), mixing step of an ethylene propylene diene monomer (EPDM) and polypropylene (PP) (S3), and EPDM dynamic crosslinking step (S4).

In the powder mixing step (S1), powders such as fillers, other additives, and the like except for the ethylene propylene diene monomer (EPDM) and the polypropylene (PP) are premixed. Specifically, the various chemicals are mixed in a super mixer so that dispersed chemicals may be put in the extruder.

In the extruder input step (S2), each raw material is put in the extruder. Specifically, the ethylene propylene diene monomer (EPDM), the polypropylene (PP), and the premixed powders are put in the extruder through a quantitative supply device in a predetermined ratio.

In the EPDM and PP mixing step (S3), each raw material is mixed through an air gap between screw and barrel of the extruder.

In the EPDM dynamic crosslinking step (S4), EPDM is dynamically crosslinked. A temperature of the barrel is adjusted, and the screws are combined to perform an optimal dynamic crosslinking reaction. In order to increase efficiency of the dynamic crosslinking reaction, a kneading part (reinforcing a shear force) may be added to the screw combination to make EPDM particles smaller.

Finally, the dynamically-crosslinked thermoplastic elastomer product may be cut and pelletized as soon as discharged (S5).

In addition, a weather strip for a vehicle according to still another embodiment includes the thermoplastic elastomer according to another embodiment.

Figure 2:
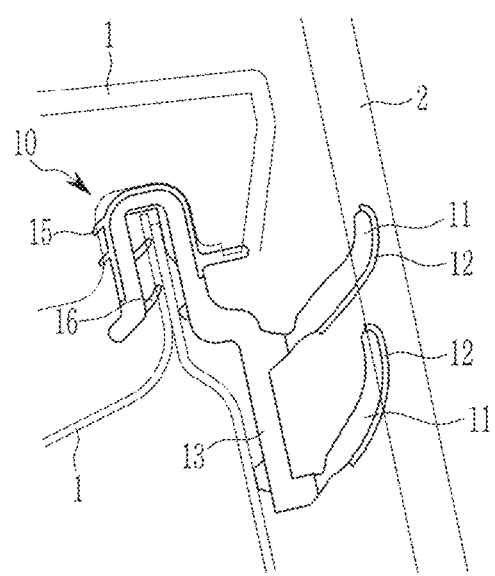
FIG. 2 is a cross-sectional view illustrating a weather strip for a vehicle according to an embodiment.

FIG. 2 is a cross-sectional view showing the weather strip for a vehicle. Referring to FIG. 2, a weather strip 10 may include a sealing lip 11 and a flocking member 12 that forms a contact surface with a door glass 2, and a body part 13 including a reinforcing core material inserted therein and serving as a support and made of a SUS material, a fixed part 15 fixed to the outside along the belt line part of the door panel 1, and an exterior wall sealing lip 16 closely supported by the door panel 1.

Herein, the sealing lip 11, the fixed part 15, the exterior wall sealing lip 16, or a combination thereof may include the thermoplastic elastomer.

Hereinafter, specific examples of the disclosure are presented. However, the examples described below are for illustrative purposes only, and the scope of the disclosure is not limited thereto.

PREPARATION EXAMPLE: PREPARATION OF THERMOPLASTIC ELASTOMER

Preparation Example 1

An EPDM/PP thermoplastic elastomer was prepared by mixing components in a ratio shown in Table 1 and using a twin screw extruder.

Preparation Example 2

An EPDM/PP thermoplastic elastomer composition was prepared according to the same method as Preparation Example 1 except that 31 parts by weight of polypropylene (PP) was mixed as shown in Table 1.

Preparation Example 3

An EPDM/PP thermoplastic elastomer composition was prepared according to the same method as Preparation Example 2 except that EPDM including 56 wt % of polyethylene (PE) was mixed.

Preparation Example 4

An EPDM/PP thermoplastic elastomer composition was prepared according to the same method as Preparation Example 3 except that EPDM including 8.9 wt % of 5-ethylidene-2-norbornene (ENB) was mixed.

Preparation Example 5

An EPDM/PP thermoplastic elastomer composition was prepared according to the same method as Preparation Example 4 except that 75 parts by weight of a plasticizer (process oil) was mixed

TABLE 1

| Component | Preparation Example 1 | Preparation Example 2 | Preparation Example 3 | Preparation Example 4 | Preparation Example 5 |
|---|---|---|---|---|---|
| EPDM | 80 | 80 | 80 | 80 | 80 |
| PE content | 67 wt % | 67 wt % | 56 wt % | 58 wt % | 58 wt % |
| ENB content | 5.7 wt % | 5.7 wt % | 5.7 wt % | 8.9 wt % | 8.9 wt % |
| PP | 71 | 31 | 31 | 31 | 31 |
| Crosslink agent[1)] | 0.76 | 0.76 | 0.76 | 0.76 | 0.76 |
| Crosslink aid [2)] | 0.27 | 0.27 | 0.27 | 0.27 | 0.27 |
| Surface modifier | 2 | 2 | 2 | 2 | 2 |
| Lubricant[3)] | 1.7 | 1.7 | 1.7 | 1.7 | 1.7 |
| Antioxidant | 0.4 | 0.4 | 0.4 | 0.4 | 0.4 |
| Crosslink accelerator [4)] | 3 | 3 | 3 | 3 | 3 |

TABLE 1-continued

| Component | Preparation Example 1 | Preparation Example 2 | Preparation Example 3 | Preparation Example 4 | Preparation Example 5 |
|---|---|---|---|---|---|
| Filler[5] | 29.5 | 29.5 | 29.5 | 29.5 | 29.5 |
| UV stabilizer | 2 | 2 | 2 | 2 | 2 |
| Plasticizer[6] | 75 | 75 | 75 | 75 | 85 |

(unit: parts by weight)
[1] Crosslink agent: Peroxide
[2] Crosslink aid: Triallyl cyanurate
[3] Lubricant: Stearic acid
[4] Crosslink accelerator: Zinc oxide
[5] Filler: Calcium carbonate, carbon black
[6] Plasticizer: Paraffin oil Experimental Example 1

The thermoplastic elastomer compositions of Preparation Examples 1 to 5 were formed into each 2 mm-thick sheet by using an injection molding machine and then, processed into various specimens for evaluating properties.

Property tests were performed as follows, and the results are shown in Tables 2 and 3.

1) Tensile Property: measured at 500 mm/min according to ISO37 standard by using DUT-500C equipment made by Daekyung Engineering Co., Ltd.

2) Compression Set: conducted in an oven at 70° C. for 22 hours after applying 25% of strain according to the ISO815 standard.

3) Material Damping (Tan δ): Average Tan δ was obtained at room temperature (24° C.) or a low temperature (−4° C. to 4° C.) after performing a temperature sweep at 0.2% of dynamic strain and 10 Hz by using a Q850 equipment (dynamic mechanical analysis, DMA) made by TA Instruments.

4) Friction Coefficient and Noise Acceleration: A friction coefficient and an acceleration peak during the stick slip were measured by conducting a friction test under a vertical load of 5 N at a speed of 3 mm/s with an equipment made by ZINS-Ziegler Instrument GmbH.

TABLE 2

| Properties | unit | Preparation Example 1 | Preparation Example 2 | Preparation Example 3 | Preparation Example 4 | Preparation Example 5 |
|---|---|---|---|---|---|---|
| 50% Modulus | Mpa | 2.94 | 1.47 | 1.24 | 1.28 | 1.07 |
| Tensile strength | Mpa | 7.14 | 4.39 | 4.05 | 4.63 | 4.18 |
| Tensile elongation | — | 5.04 | 3.19 | 3.43 | 3.5 | 3.43 |
| Compression set 70° C. × 22 hr | % | 45.44 | 35.35 | 31.45 | 29.51 | 29.53 |
| Material damping (Tan δ) −4 to 4° C., 10 Hz | — | 0.139 | 0.144 | 0.149 | 0.155 | 0.158 |

TABLE 3

| Properties | unit | Preparation Example 1 | Preparation Example 2 | Preparation Example 3 |
|---|---|---|---|---|
| Static friction coefficient | — | 0.9 | 0.83 | 0.69 |
| Kinetic friction coefficient | — | 0.67 | 0.69 | 0.64 |
| Maximum acceleration | g | 2.44 | 1.38 | 1.03 |

Referring to Table 2, comparing Preparation Example 1 with Preparation Example 2, when a PP content decreased from 51 parts by weight to 31 parts by weight, the 50% modulus, tensile strength, and tensile elongation respectively decreased by 50.0%, 38.5%, and 36.7%, respectively, but the compression set was improved by 22.2%, and the material damping also was improved by 3.6%.

Comparing Preparation Example 2 with Preparation Example 3, when a PE content of EPDM was reduced from 67 wt % into 56 wt %, the 50% modulus and the tensile strength decreased by 15.6% and 7.7%, respectively, but the tensile elongation increased by 7.5%. In addition, the compression set and the material damping were improved by 11.0% and 3.5%, respectively.

Comparing Preparation Example 3 with Preparation Example 4, when a ENB content of EPDM was increased from 5.7 wt % to 8.9 wt %, the 50% modulus, the tensile strength, and the tensile elongation increased by 3.2%, 14.3%, and 2.0%, respectively. In addition, the compression set and the material damping were also improved by 6.2% and 4.0%, respectively.

Comparing Preparation Example 4 with Preparation Example 5, when the content of the plasticizer (process oil) was increased from 75 parts by weight to 85 parts by weight, the 50% modulus, the tensile strength, and the tensile elongation respectively decreased by 16.4%, 9.7%, and 2.0%, respectively. The compression set was almost similar, and the material damping was improved by 1.9%, wherein Preparation Example 5 had a low compression set of 29.53% as well as exhibited the highest material damping of 0.158.

Referring to Table 3, comparing Preparation Examples 1 to 3, as the material damping was higher, each static friction coefficient decreased to 0.90, 0.83, and 0.69 by 7.8% and 16.9%, and each kinetic friction coefficient was 0.67, 0.69, and 0.64, which increased by 3.0% and decreased by 7.2%, respectively, wherein Preparation Example 5 had the lowest friction coefficient. When the stick slip occurred, the maximum acceleration was 2.44, 1.38, and 1.03, respectively, which decreased by 43.4% and 25.4%, confirming that Preparation Example 5 had noise and vibration-reducing effects.

Experimental Example 2

Figure 3:
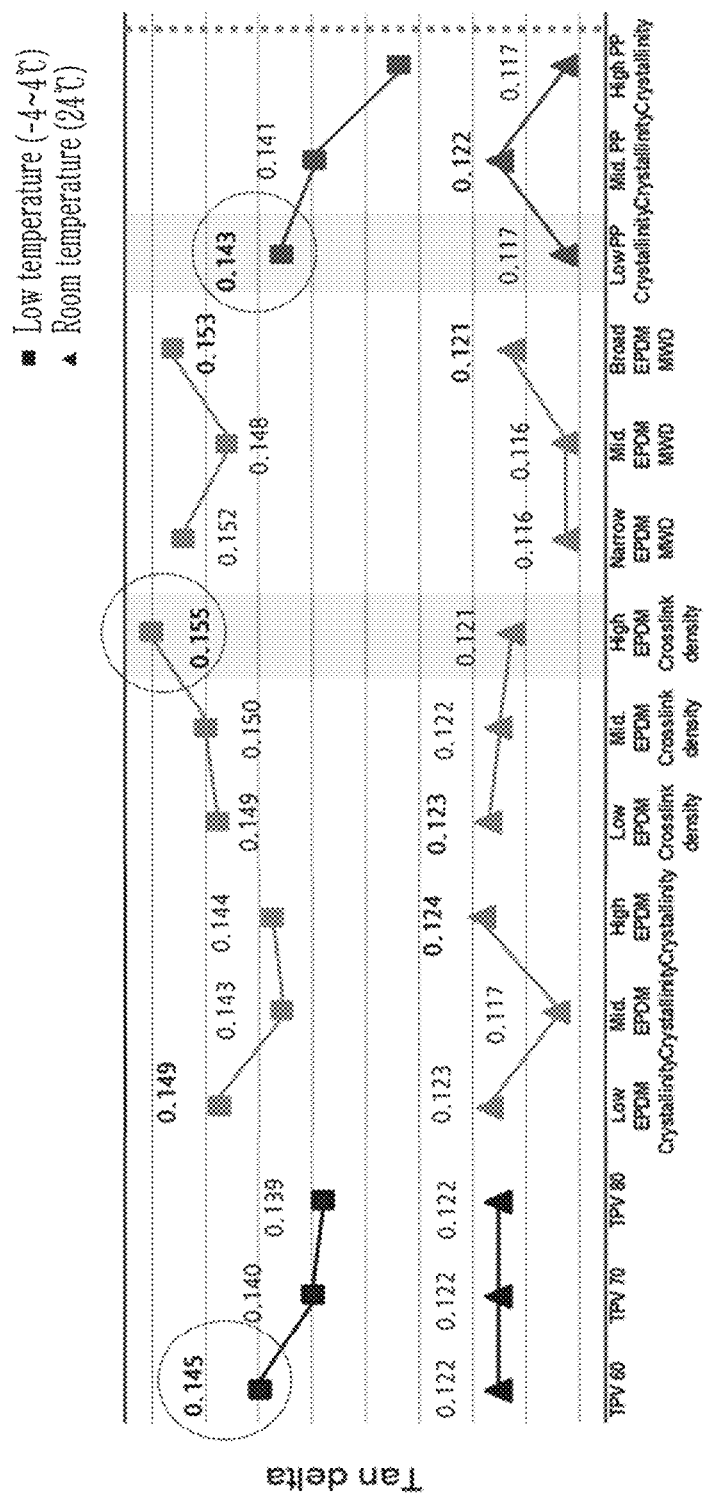
FIG. 3 is a graph showing the results of measuring the material damping properties of the thermoplastic elastomer according to changes of the crystallinity, crosslinking density and molecular weight distribution of EPDM, and changes of the crystallinity of PP in Experimental Example 2.
Figure 4:
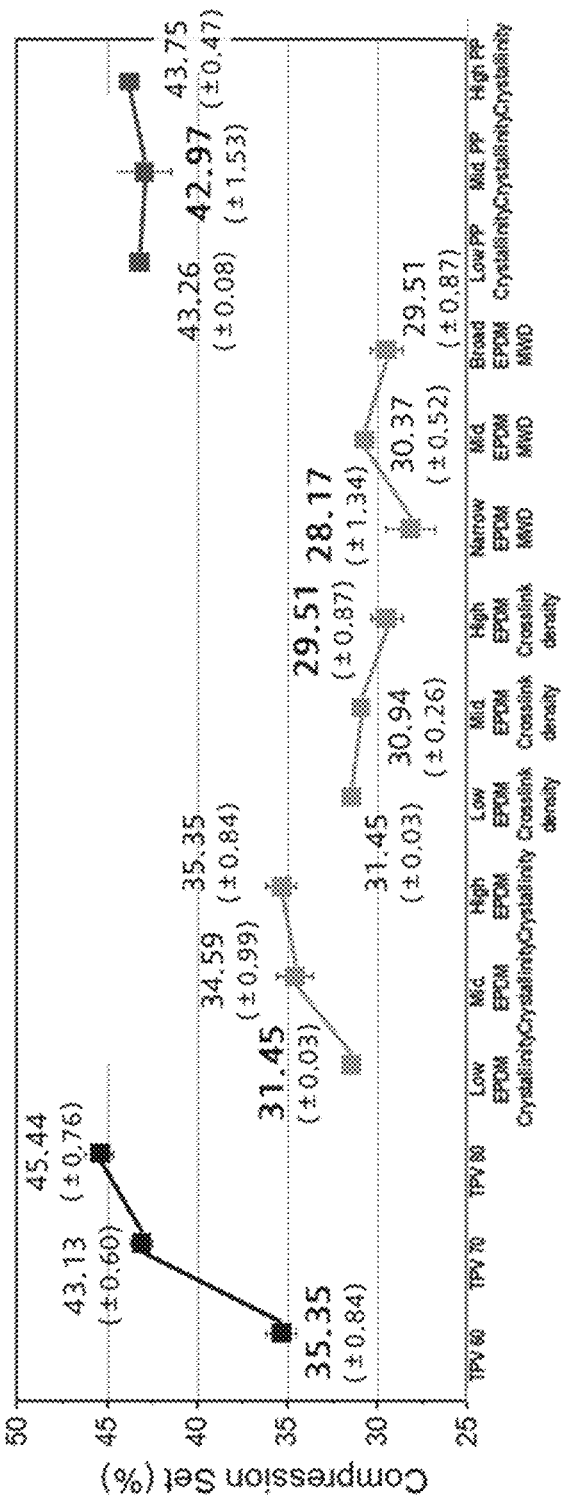
FIG. 4 is a graph showing the results of measuring the compression set of the thermoplastic elastomer according to the changes of the crystallinity, crosslinking density, and molecular weight distribution of EPDM, and changes of crystallinity of PP in Experimental Example 2.

In the thermoplastic elastomer including 35.4 wt % of EPDM and 13.7 wt % of PP, crystallinity, crosslinking density, and molecular weight distribution of EPDM and material damping property and compression set of the thermoplastic elastomer according to a crystallinity change of PP were measured, and the results are shown in FIGS. 3 and 4. The material damping property and the compression set were measured in the same manner as in Experimental Example 1.

In FIGS. 3 and 4, TPV 60, TPV 70, and TPV 80 correspond to when PP content was 31 parts by weight (14 wt %), 51 parts by weight (21 wt %), and 71 parts by weight (27 wt %), respectively. The specific compositions of TPV 60, TPV 70, and TPV 80 are shown in Table 4. Low EPDM Crystallinity, Mid EPDM Crystallinity, and High EPDM Crystallinity correspond to when PE content of EPDM was 56 wt %, 62 wt %, and 67 wt %, respectively, and Low EPDM Crosslink density, Mid EPDM Crosslink density, High EPDM Crosslink density correspond to when ENB content of EPDM was 5.7 wt %, 7.3 wt %, and 8.9 wt %, respectively.

TABLE 4

| Component | TPV60 | TPV70 | TPV80 |
| --- | --- | --- | --- |
| EPDM | 80 (35 wt %) | 80 (33 wt %) | 80 (30 wt %) |
| PP | 31 (14 wt %) | 51 (21 wt %) | 71 (27 wt %) |
| Crosslink agent[1] | 0.76 | 0.76 | 0.76 |
| Crosslink aid[2] | 0.27 | 0.27 | 0.27 |
| Lubricant[3] | 1.7 | 1.7 | 1.7 |
| Crosslink accelerator[4] | 3 | 3 | 3 |
| First filler[5] | 13.5 | 13.5 | 13.5 |
| Second filler[6] | 6 | 6 | 6 |
| Plasticizer[7] | 75 | 75 | 75 |

(unit: parts by weight)
[1] Crosslink agent: Peroxide
[2] Crosslink aid: Triallyl cyanurate
[3] Lubricant: Stearic acid
[4] Crosslink accelerator: Zinc oxide
[5] First filler: Calcium carbonate
[6] Second filler: Carbon black
[7] Plasticizer: Paraffin oil Referring to FIGS. 3 and 4, as the PE content of EPDM was lower, the crosslinking density was higher, and the crystallinity of PP was lower, the material damping properties were improved.

Figure 5:
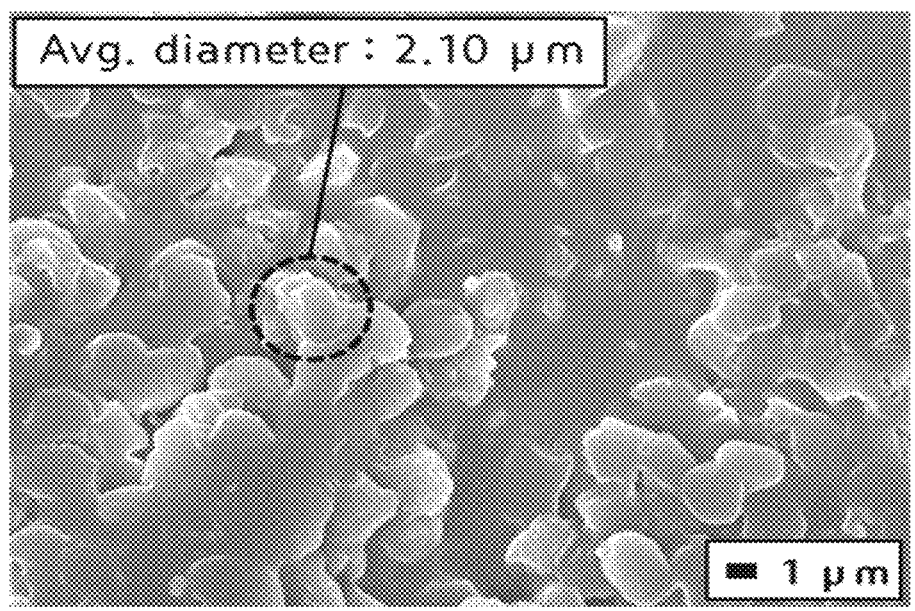
FIGS. 5 to 7 are electron micrographs showing the EPDM particle sizes according to the ENB contents of the EPDM, respectively.
Figure 6:
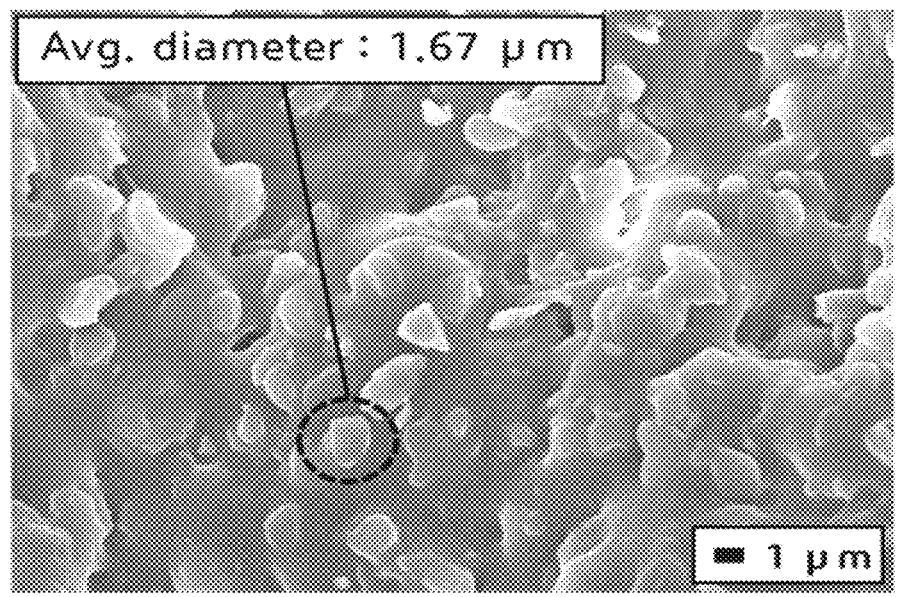
Figure 7:
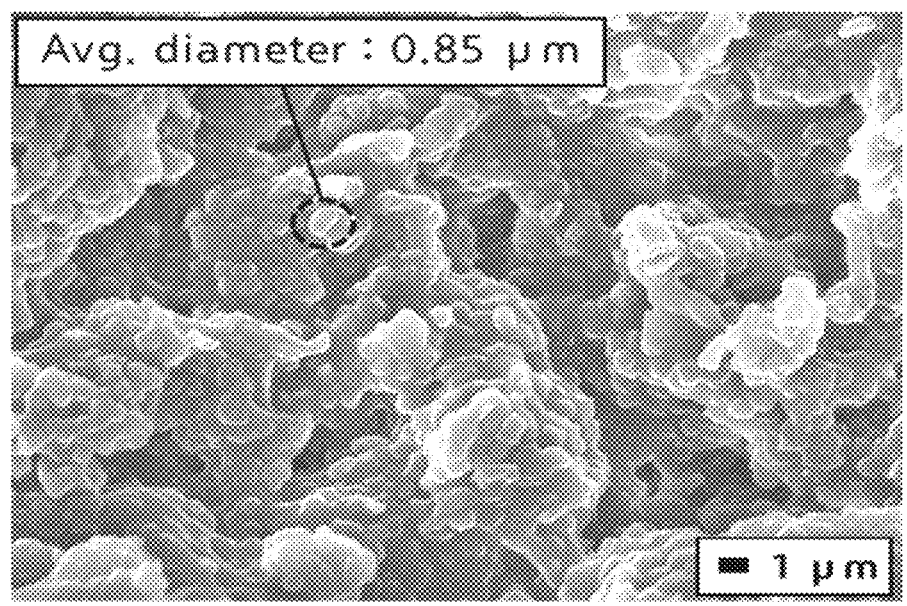

FIGS. 5 to 7 are electron microscope photographs showing an EPDM particle size according to an ENB content of EPDM. FIGS. 5 to 7 respectively show when ENB content of EPDM was 5.7 wt %, 7.3 wt %, and 8.9 wt %.

Referring to FIGS. 5 to 7, as the ENB content of EPDM increased, EPDM particles had a reduced size (e.g., an average diameter) of 2.10 μm, 1.67 μm, and 0.85 μm, respectively. Accordingly, as dispersibility of EPDM was improved, and a friction loss at the interface of EPDM and PP increased, there were effects of improving an elastic force and permanent deformation and simultaneously, increasing damping.

Experimental Example 3

Figure 8:
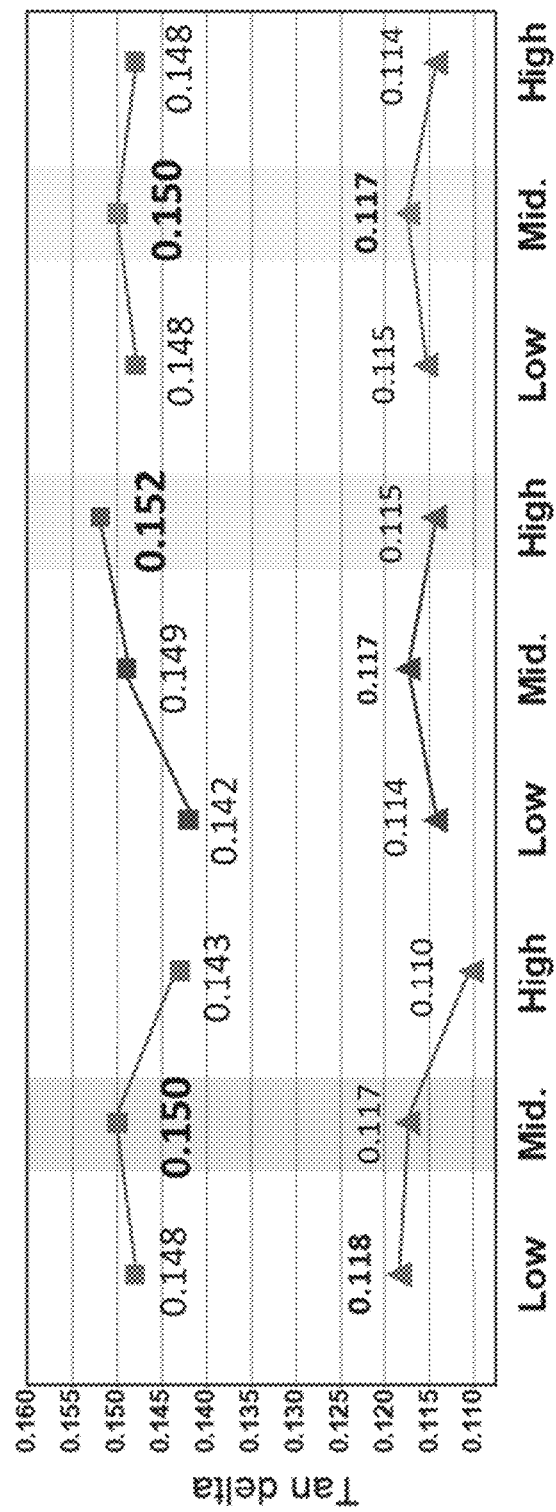
FIG. 8 is a graph showing the results of measuring the material damping properties of the thermoplastic elastomer according to changes in the content of the crosslink agent, the content of the plasticizer, and the content of the filler in Experimental Example 3.
Figure 9:
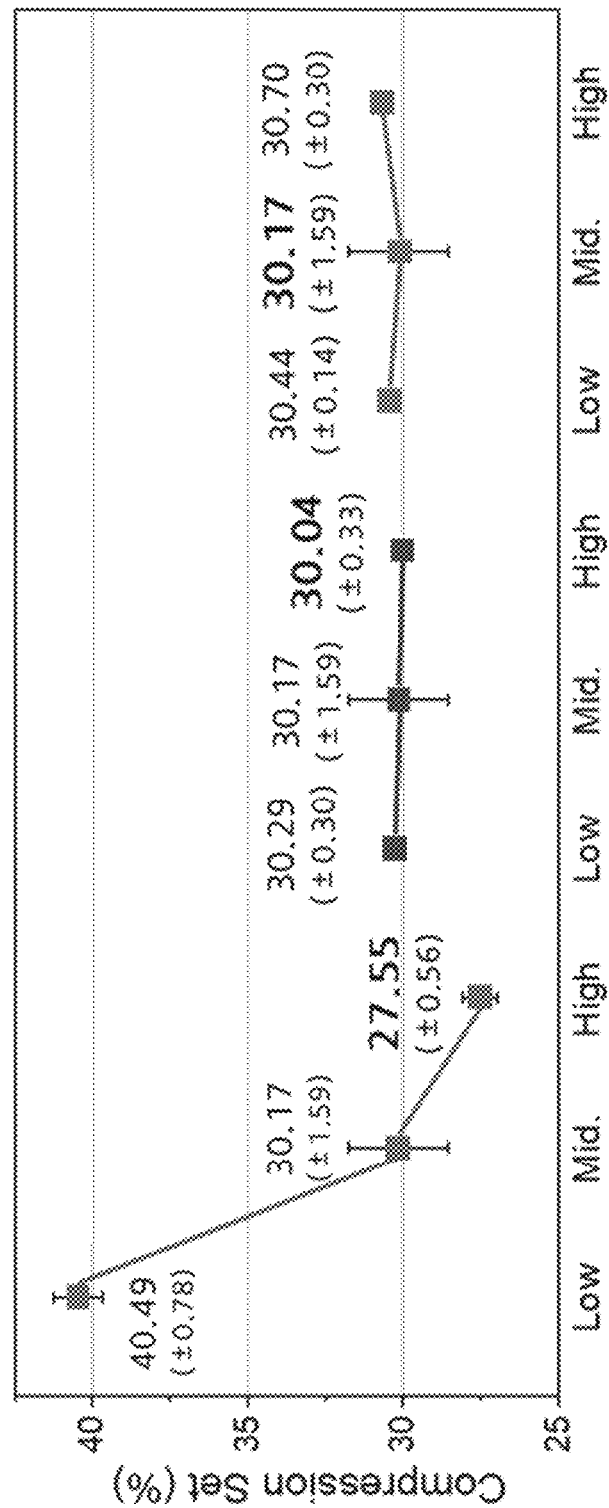
FIG. 9 is a graph showing the results of measuring the compression set of the thermoplastic elastomer according to changes of the content of the crosslink agent, the content of the plasticizer, and the content of the filler in Experimental Example 3.

In a thermoplastic elastomer including 35.4 wt % of EPDM and 13.7 wt % of PP, the thermoplastic elastomer was measured with respect to material damping property and compression set according to each content change of a crosslink agent, a plasticizer (process oil), and a filler, and the results are shown in FIGS. 8 and 9. The material damping property and the compression set were measured in the same manner as in Experimental Example 1.

In FIGS. 8 and 9, "Low, Mid, and High" crosslink agent contents respectively show when content of crosslink agent was 0.76 parts by weight (0.34 wt %), 1.0 part by weight (0.44 wt %), and 1.25 parts by weight (0.55 wt %), "Low, Mid, and High" process oil contents respectively show when content of a plasticizer was 65 parts by weight (30.1 wt %), 75 parts by weight (33.2 wt %), and 85 parts by weight (36.0 wt %), and "Low, Mid, and High" filler contents respectively show when content of the filler was 10 parts by weight (4.71 wt %), 23.5 parts by weight (10.4 wt %), and 30 parts by weight (12.9 wt %).

Referring to FIGS. 8 and 9, when the content of a plasticizer was increased, damping performance was improved, but when the content of the crosslink agent was increased, the damping performance was rather deteriorated, but the content of the filler was independent of the damping performance.

Experimental Example 4

Figure 10:
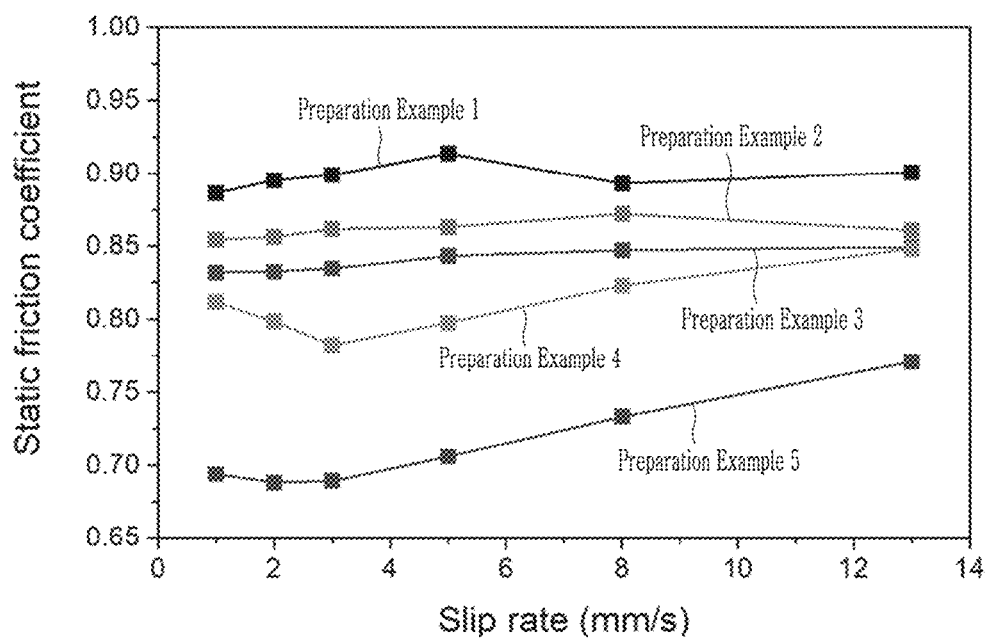
FIG. 10 is a graph showing the results of measuring the friction coefficient changes of the thermoplastic elastomers according to Preparation Examples 1 to 5 in Experimental Example 4.
Figure 11:
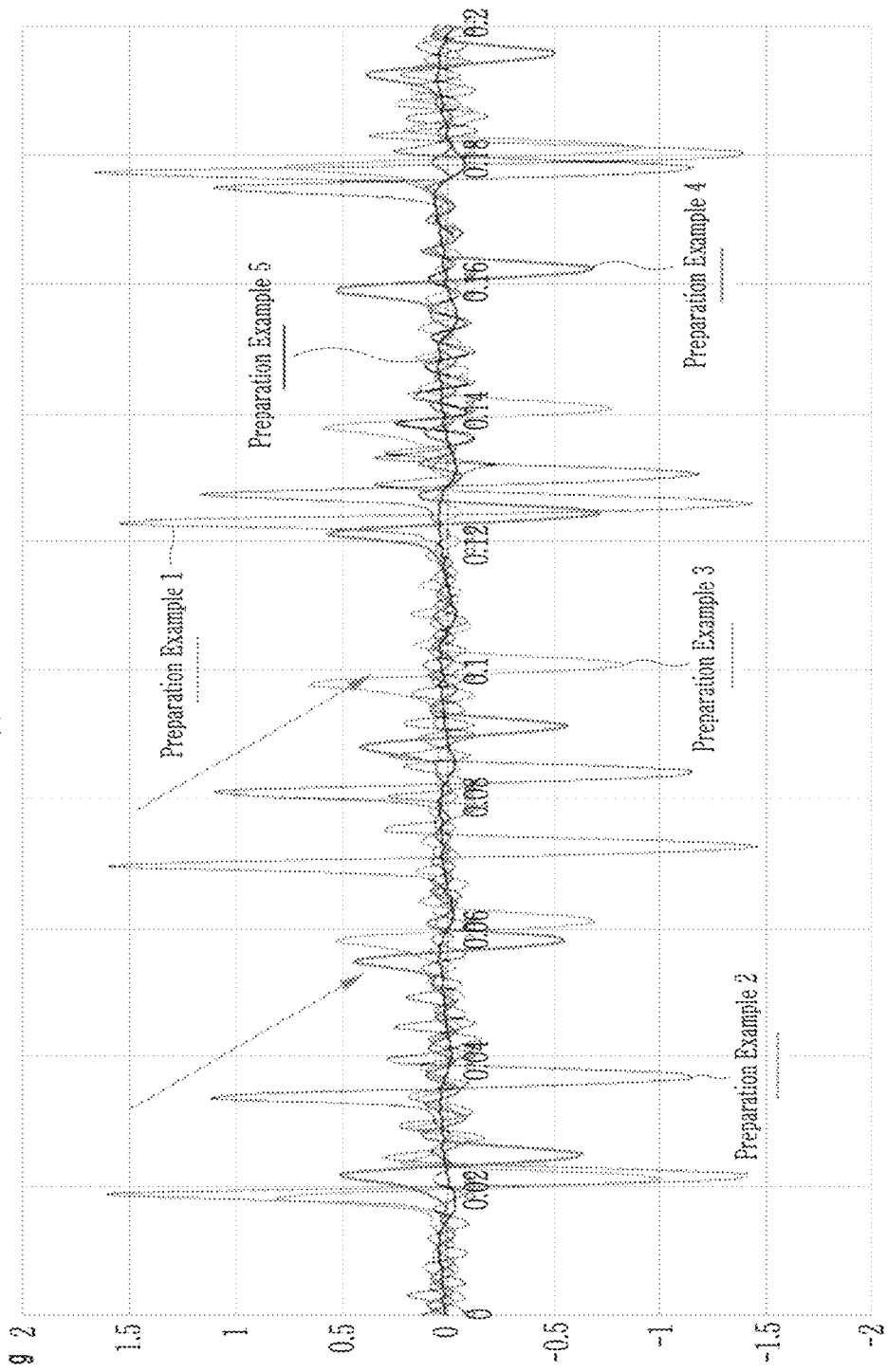
FIG. 11 is a graph showing the results of measuring the frictional vibration acceleration magnitude changes of the thermoplastic elastomers according to Preparation Examples 1 to 5 in Experimental Example 4.

The thermoplastic elastomers according to Preparation Examples 1 to 5 were measured with respect to a friction coefficient change and a frictional vibration acceleration magnitude change, and the results are shown in FIGS. 10 and 11 and summarized in Table 5.

TABLE 5

| | Friction coefficient | Max acceleration |
| --- | --- | --- |
| Preparation Example 1 | 0.278 | 2.44 |
| Preparation Example 2 | 0.213 | 1.69 |
| Preparation Example 3 | 0.235 | 1.38 |
| Preparation Example 4 | 0.181 | 1.59 |
| Preparation Example 5 | 0.208 | 1.03 |

Referring to FIGS. 10 and 11 and Table 4, when the damping was improved, a static friction coefficient and a size of friction vibration were reduced.

Accordingly, the EPDM/PP thermoplastic elastomer composition according to an embodiment had an effect of increasing material damping and thus recuing friction noises and vibrations. Then, when the composition was applied to an inner belt weather strip, emotional quality was expected to be enhanced by improving sealing performance and simultaneously, the friction vibrations and noises. In addition, the composition may be variously applied by adjusting physical properties of a final product according to a composition change of components.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A thermoplastic elastomer composition, comprising
    about 80 parts by weight of an ethylene propylene diene monomer (EPDM) including 5-ethylidene-2-norbornene (ENB) and polyethylene,
    about 31 parts by weight to about 35 parts by weight of polypropylene,
    about 20 parts by weight to about 40 parts by weight of a filler, and about 60 parts by weight to about 90 parts by weight of a plasticizer, wherein the ethylene propylene diene monomer has a crystallinity of about 0% to about 15.8%, a crosslinking density of about $2.26 \times 10^{-4}$ mol/ml to about $2.68 \times 10^{-4}$ mol/ml, and a molecular weight distribution of about 3.4 to about 4.3, and wherein the polypropylene has a crystallinity of about 52% to about 60%.

2. The thermoplastic elastomer composition of claim 1, wherein the ethylene propylene diene monomer comprises about 5 wt % to about 10 wt % of 5-ethylidene-2-norbornene and about 50 wt % to about 70 wt % of polyethylene, based on the total weight of the ethylene propylene diene monomer.

3. The thermoplastic elastomer composition of claim 2, wherein the ethylene propylene diene monomer comprises about 8.9 wt % to about 10 wt % of 5-ethylidene-2-norbornene and about 50 wt % to about 58 wt % of polyethylene, based on the total weight of the ethylene propylene diene monomer.

4. The thermoplastic elastomer composition of claim 1, wherein the thermoplastic elastomer composition comprises about 85 parts by weight to about 90 parts by weight of the plasticizer.

5. The thermoplastic elastomer composition of claim 1, wherein the thermoplastic elastomer composition further comprises about 0.1 parts by weight to about 1.25 parts by weight of a crosslink agent.

6. The thermoplastic elastomer composition of claim 1, wherein the thermoplastic elastomer composition comprises about 0.1 parts by weight to about 0.5 parts by weight of a crosslink aid, about 0.1 parts by weight to about 0.5 parts by weight of an antioxidant, about 1 part by weight to about 3 parts by weight of a surface modifier, about 1 part by weight to about 3 parts by weight of a lubricant, about 1 part by weight to about 3 parts by weight of a crosslink accelerator, about 1 part by weight to about 5 parts by weight of a UV stabilizer, or a mixture thereof.

7. A thermoplastic elastomer manufactured of the thermoplastic elastomer composition of claim 1, having a loss factor (Tan δ) of greater than or equal to about 0.139, and having a compression set of less than or equal to about 45.44%, wherein the loss factor (Tan δ) is an average Tan δ obtained at a low temperature (−4° C. to 4° C.) after performing a temperature sweep at 0.2% of dynamic strain and 10 Hz by using a Q850 equipment (dynamic mechanical analysis, DMA) made by TA Instruments, and wherein the compression set is obtained in an oven at 70° C. for 22 hours after applying 25% of strain according to the ISO815 standard.

8. The thermoplastic elastomer of claim 7, wherein the thermoplastic elastomer has the loss factor (Tan δ) of about 0.144 to about 0.158, and the compression set of about 29.53% to about 35.35%.

9. The thermoplastic elastomer of claim 7, wherein the thermoplastic elastomer has a static friction coefficient of less than or equal to about 0.9, a kinetic friction coefficient of less than or equal to about 0.69, and a maximum acceleration of less than or equal to about 2.44 g during stick slip.

10. A method for manufacturing the thermoplastic elastomer of claim 7, comprising mixing powders including fillers, introducing ethylene propylene diene monomer (EPDM), polypropylene (PP), and the mixed powders into an extruder, mixing the ethylene propylene diene monomer and polypropylene in the extruder, and dynamically crosslinking the ethylene propylene diene monomer.

11. A weather strip for a vehicle including the thermoplastic elastomer of claim 7.

12. The thermoplastic elastomer composition of claim 1, wherein the thermoplastic elastomer composition comprises:

80 parts by weight of the ethylene propylene diene monomer (EPDM) including 5-ethylidene-2-norbornene (ENB) and polyethylene, 31 parts by weight to 35 parts by weight of polypropylene, 20 parts by weight to 40 parts by weight of the filler, and 60 parts by weight to 90 parts by weight of the plasticizer.

13. The thermoplastic elastomer composition of claim 12, wherein the ethylene propylene diene monomer has a crystallinity of 0% to 15.8%, a crosslinking density of $2.26 \times 10^{-4}$ mol/ml to $2.68 \times 10^{-4}$ mol/ml, and a molecular weight distribution of 3.4 to 4.3, and wherein the polypropylene has a crystallinity of 52% to 60%.

* * * * *

UNITED STATES PATENT AND TRADEMARK OFFICE
CERTIFICATE OF CORRECTION

PATENT NO. : 11,680,126 B2  
APPLICATION NO. : 17/532473  
DATED : June 20, 2023  
INVENTOR(S) : Sang Hyun Lee et al.

Page 1 of 1

It is certified that error appears in the above-identified patent and that said Letters Patent is hereby corrected as shown below:

On the Title Page

Column 1, Item (73) replace the present listing with the following:
-- (73) HYUNDAI MOTOR COMPANY, Seoul (KR); Kia Corporation, Seoul (KR); HWASEUNG Material Co., Ltd., Yangsan-si (KR); Research & Business Foundation SUNGKYUNKWAN UNIVERSITY, Suwon-si (KR) --

Signed and Sealed this  
Twenty-second Day of August, 2023

Katherine Kelly Vidal  
*Director of the United States Patent and Trademark Office*